United States Patent
Scheibe

(10) Patent No.: US 6,390,730 B1
(45) Date of Patent: May 21, 2002

(54) PROTECTIVE ELEMENTS, DEVICES COMPRISING SAID ELEMENTS AND METHOD FOR PROTECTING A ZONE AGAINST FLOODS AND AVALANCHES

(76) Inventor: Klaus Wolfgang Scheibe, Seestrasse 361, Posttach 1112, CH-8038, Zürich (CH)

( * ) Notice: Subject to any disclaimer, the term of this patent is extended or adjusted under 35 U.S.C. 154(b) by 0 days.

(21) Appl. No.: 09/530,863

(22) PCT Filed: Nov. 4, 1998

(86) PCT No.: PCT/CH98/00472

§ 371 Date: May 5, 2000

§ 102(e) Date: May 5, 2000

(87) PCT Pub. No.: WO99/24675

PCT Pub. Date: May 20, 1999

(30) Foreign Application Priority Data

Nov. 5, 1997 (CH) .............................................. 2550/97
Aug. 26, 1998 (CH) .............................................. 1745/98

(51) Int. Cl.[7] .............................. E02B 3/10; E02B 7/40
(52) U.S. Cl. ........................ 405/100; 405/94; 256/12.5; 256/13
(58) Field of Search ............................. 405/92, 15, 87, 405/94, 99, 100, 101, 102, 106, 258.1; 256/12.5, 13

(56) References Cited

U.S. PATENT DOCUMENTS

| | | | | |
|---|---|---|---|---|
| 1,353,285 A | * | 9/1920 | Sommer ...................... | 405/101 |
| 1,938,675 A | * | 12/1933 | Young ......................... | 405/101 |
| 4,549,724 A | * | 10/1985 | Taillandier ................. | 256/12.5 |
| 6,053,479 A | * | 4/2000 | Lang et al. ................. | 256/12.5 |
| 6,132,140 A | * | 10/2000 | Kullberg ...................... | 405/90 |

FOREIGN PATENT DOCUMENTS

| | | |
|---|---|---|
| DE | 35 02 243 | 7/1986 |
| EP | 0 741 205 | 11/1996 |
| EP | 0 802 285 | 10/1997 |
| NL | 8801251 | 12/1989 |

* cited by examiner

*Primary Examiner*—David Bagnell
*Assistant Examiner*—Frederick L. Lagman
(74) *Attorney, Agent, or Firm*—Venable; Gabor J. Kelemen

(57) ABSTRACT

The invention concerns a protective element (1) comprising a plate (2) with a first longitudinal edge (3) and a second longitudinal edge (4) spaced by a distance (D) from each other, and a pivot bearing (5, 5') arranged substantially parallel to the first longitudinal edge and/or the second longitudinal edge, designed for transferring forces, whereby the plate (2) is arranged mobile on a substructure (6) to absorb the forces exerted on the protective element, in particular on a protection system against floods and avalanches, and capable of being arranged mobile relative to said substructure (6), in a pivot zone (S). The invention is characterized in that the pivot bearing (5, 5') is mounted sealed, and in order to compensate the forces being exerted on the plate (2) or on the bearing (5, 5'), said bearing is placed at a distance, at most a quarter of the distance (D) of a geometric axis, optionally of the plate (2) axis (7) passing through the center of gravity, between the first and second longitudinal edges, substantially parallel to the longitudinal edges (3, 4). Depending of the configuration of its surface, the protective element (1) can be produced in the form of a walkway or a lane, or carry solar collectors, or as means for transferring forces, and integrated in a system of protection against floods and avalanches.

20 Claims, 2 Drawing Sheets

PROTECTIVE ELEMENTS, DEVICES COMPRISING SAID ELEMENTS AND METHOD FOR PROTECTING A ZONE AGAINST FLOODS AND AVALANCHES

The invention relates, in accordance with a first aspect and the preamble of Claim 1, to a protective element having a plate which has a first longitudinal edge and a second longitudinal edge, the edges being spaced apart from each other by a distance (D), and the protective element including a pivot bearing which is arranged essentially parallel to the first longitudinal edge and/or to the second longitudinal edge, is designed for transmitting forces and by means of which, in order to absorb forces acting on the protective element, the plate can be arranged on a substructure, in particular on a device for protecting against floods or avalanches, and such that it can move with respect to this substructure in a swivelling range (S). The invention furthermore relates, in accordance with further aspects, to devices for protecting against floods or avalanches, and to a method for protecting an area against floods or avalanches.

Unfavourable climatic circumstances repeatedly and all too frequently cause enormous amounts of precipitation to turn whole areas and large parts of individual provinces into inundated areas within a very short period. It is obvious in this case that existing protective measures, such as dyke systems, barrier measures, drainage and property protection systems are often of insufficient size to withstand the excessive water levels and to contain the respective volumes of water.

Devastating inundations, for example the inundations in the Oder-Neisse area in 1997, China 1998, or else annually recurring floods (for example, in the, Rhine plain in Cologne), which have considerable economic decisively improve and supplement existing flood protection systems or to redesign them. As far as is known, measures for redesigning and renewing dyke systems concentrate essentially on the following:

The consequent expansion in capacity of retaining spaces

Stabilizing earth-filled dams using a very wide variety of measures

Eliminating the risk of earth-filled dams becoming sodden in the event of floods and heavy rainfall Enlarging the holding capacity by raising the dyke summit and enlarging the base of dyke systems Protection of existing buildings by means of temporarily erected stop-gaps or permanent new protection systems.

In the realization of projects of this type, ecology, dyke protection and also economic demands frequently contradict one another: popular solutions include configuring and dimensioning the capacity and design of dyke systems and retaining spaces to cope with extreme precipitation and flood conditions and also with extremely high water levels. Reinforcing and raising the dam profiles (if this is indeed possible) require huge movements of earth and the sacrificing of large areas of land. Some of the investments undertaken for large-scale retaining spaces and dykes therefore remain virtually unused for years, perhaps for decades, while considerable disadvantages to the landscape, for example as a result of high dyke summits and too great a requirement of land, are accepted at the same time. There is therefore a demand for movable or mobile flood protection systems which require significantly less land.

In the city centre in Cologne, mobile flood protection walls, which are known as the "Cologne barrier" have been installed for some time. During periods of normal or low water, the elements required for this are stored in suitable places, so that the bank of the Rhine which is touristically and historically attractive and is also important in terms of town planning is not permanently disadvantageously affected in terms of town planning because of this flood protection. In the event of a flood alarm, within the period of approximately 24 to 48 hours until the flood strikes, the protective elements have to be taken out of the store, transported to the location of use and installed there by professionals. This requires a permanent, specially trained task force. This task force and also the storage, transportation and installation means considerably increase the costs of the protection walls; a fairly long reaction time to an acute, short-term risk of flooding may be regarded as a further disadvantage of this system.

EP 0 741 205 A1 disclosed a movable or mobile flood protection system, in which protective elements can simply be swivelled from a horizontal position into a vertical position, or can be installed upright. In a first embodiment, this system has a holding chamber which is divided into a floodable floating chamber and a swivel-in chamber, and has one or more wall elements. These wall elements themselves consist of a pontoon part, which can be swivelled into the floating chamber and is made buoyant by floods, and of a counterweight part, which can be sunk into the swivel-in chamber, and also of a supporting element which is designed, for example, as a sheet-pile wall and in whose head region the wall elements are mounted in a manner which allows them to swivel. In a second embodiment, the system has all elements which can be latched into an anchorage. In both systems proposed, it could be regarded as disadvantageous that the forces acting, because of the accumulated water, on the protection walls are distributed unfavourably since they act virtually only on the pivot point of the protection wall and on the lower seal thereof. In addition, the complete swivelling back of the wall elements according to the first embodiment can be made considerably more difficult due to dirt accumulated in the floating chamber, which faces towards the flood. Moreover, the seal-tightness of the protection wall at just a low flood level is not unconditionally ensured: thus—in particular in the second embodiment—the hydrostatic pressure can separate the seal at the lower end of the protection wall from the sheet-pile wall, if the water level is too low, so that this pressure is exceeded by means of the banking-up pressure, which acts on the protection wall above the bolt.

Avalanche barriers are known in all alpine countries in Europe and generally cause an avalanche of snow to be stopped. Disfigurement of the landscape by the often wide avalanche barriers which can largely be seen as horizontal rows is, of necessity, accepted because of the protective action of these systems which are often significant to survival.

The continuing heating up of the Earth's surface is accompanied by the permafrost boundary being shifted to greater heights above sea level. This has, inter alia, the consequence that many mountain slopes which have been stabilized for hundreds of years by the permafrost (permanent frost all year round) can suddenly become unstable and slip; the consequence could be landslides and avalanches of scree in areas which were previously not at risk. The risk of such avalanches of scree occurring rises especially when the thaw starts (generally in early summer). Appropriate protective measures are not known to date.

The object of the invention comprises proposing a protective element and also devices and a method for protecting an area against floods or avalanches, which can be used to overcome the indicated problems from the prior art and to provide alternative solutions.

The object is achieved, in accordance with a first aspect, by the features of independent Claim 1, by the protective element mentioned at the beginning being characterized in that the pivot bearing is of sealed design and—in order to compensate for forces acting on the plate and on the bearing—is arranged spaced apart at a maximum of a quarter of the distance (D) from a geometrical axis or gravity axis of the plate, which axis runs between the first and second longitudinal edges and essentially parallel to the longitudinal edges. In accordance with further aspects, the object is achieved by a device for protecting against floods or avalanches, according to Claim 5, and also by a method for protecting an area against floods or avalanches, according to Claim 17. Preferred developments according to the invention of the protective element, of the device and of the method arise from the dependent claims.

The protective element according to the invention and devices which include one or more protective elements of this type are illustrated schematically in the figures in various embodiments which are to be understood as only being an illustration and not as a limitation. In the figures.

Figure 1:
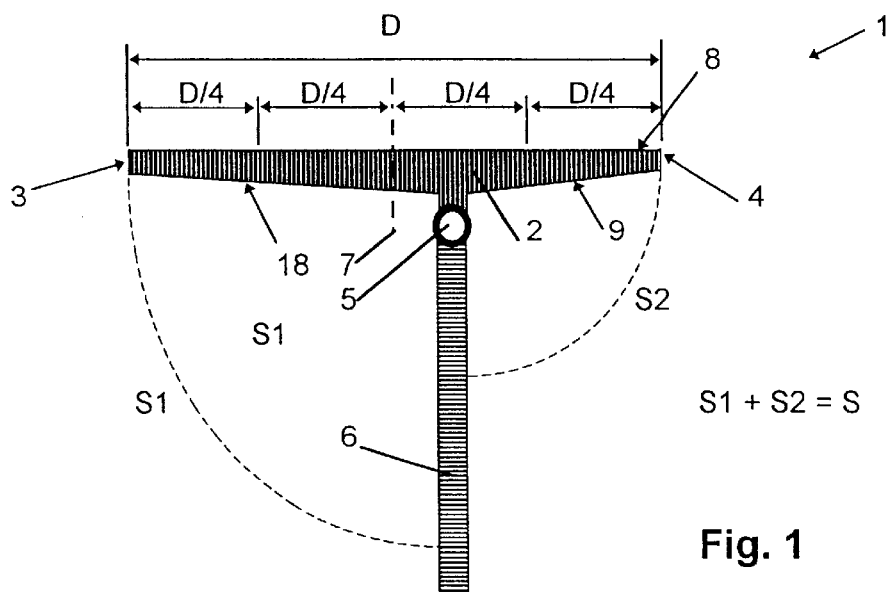
FIG. 1 shows a cross section through a protective element on a vertical substructure, in an initial position.

FIG. 1 shows a protective element 1 of a first embodiment in cross section. This protective element comprises a plate 2 having a first longitudinal edge 3 and a second longitudinal edge 4, and is fastened to a substructure 6, which is formed vertically here, by means of a pivot bearing 5. This substructure is preferably part of a device for protecting against floods or avalanches. The two longitudinal edges 3, 4 are spaced apart from each other by a distance D. The pivot bearing 5 is designed to absorb forces acting on the protective element, and is arranged such that it can move with respect to this substructure 6 in a swivelling range S. The pivot bearing 5 is of sealed design for flood protection and for avalanche protection (avalanches of snow or mud). The sealed design of the pivot bearing encompasses all of the options and techniques familiar to the expert, in particular the designing of a pivot bearing which is integrally sealed or which slides along a seal, or the provision of a seal which bears in a sliding manner against the outer surface of the pivot bearing and is fastened to the substructure 6. The seal of the pivot bearing can be omitted in order to prevent avalanches of rocks. With respect to a geometrical axis or gravity axis 7 running essentially parallel to the longitudinal edges 3, 4, a region is assumed which corresponds to twice the mass D/4 or which corresponds to the mass D/2 and the gravity axis 7 runs approximately through the centre of the said region. In this region, the pivot bearing 5 of the plate 2 is arranged in such a manner that it is at a distance from the gravity axis of at maximum D/4 and therefore also runs spaced apart from the longitudinal edges 3, 4 at least by D/4. The protective element 1 has a first surface 8 which is preferably designed such that it can be walked on or else travelled over. A second surface 9 can include solar collectors 10 (cf. FIGS. 2 and 3), such as photo-voltaic cells or devices for absorbing and storing heat. A third surface 18 is designed as a protective surface. In particular when waters are flowing rapidly, considerable damage to defences can occur because of the enormous kinetic energy of the material being washed along. For flood protection, the third surface 18 of the plate 2 is therefore preferably of flat design, i.e. is produced as far as possible without the surface having any texture; the protective element and the flood protection device can therefore be substantially less damaged by material being washed along and impacting against this protective surface. In contrast, in avalanche protection texturing of the surface (laminating it) may be desirable for visual reasons.

Figure 2:
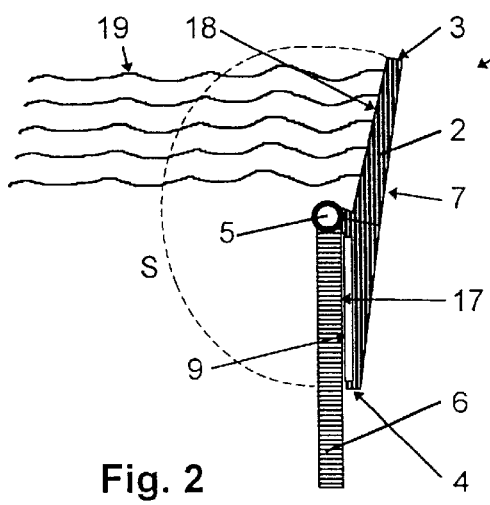
FIG. 2 shows a cross section through a protective element on a vertical substructure, in a protective position.

FIG. 2 shows a cross section through a protective element 1 corresponding to FIG. 1. The plate 2 has been swivelled about the pivot bearing 5 into the protective position. The second surface 9 preferably rests on a relatively large surface 17 of the substructure 6, so that the forces, which are exerted on the surface 18 by a flood or snow and ice, are transmitted to the part 17 of the substructure 6 in as uniform a manner as possible, and therefore in a manner which protects the structure. The force-transmitting area can encompass the whole of the second surface 9, or raised webs or pegs, for example, which are distributed over the second surface, may be formed for this purpose. Webs or pegs of this type are preferred, particularly if the second surface is fitted with solar collectors, because damage to the solar collectors can be prevented with them. In this first embodiment of a protective element 1, the first surface 8 faces away from the flood or from the snow and ice or from the scree.

Figure 3:
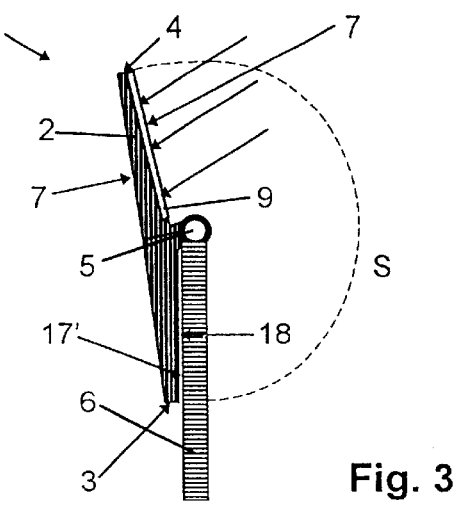
FIG. 3 shows a cross section through a protective element on a vertical substructure, in a solar energy-absorbing position.

FIG. 3 shows a cross section through a protective element 1 in accordance with a first embodiment, corresponding to FIGS. 1 and 2. The plate 2 is swivelled about the pivot bearing 5, by means of which it is arranged on the substructure 6, which is vertical in this case, of a device for protecting against floods or avalanches, into the solar energy-absorbing position. The third surface 18 rests on a part 17' of the substructure 6 and the second surface having the solar collectors advantageously faces the sun. In order to achieve an angle of incidence which is as optimum as possible, the plate 2—as illustrated—can be designed in cross section in such a manner that it decreases in thickness towards the longitudinal edges 3, 4; a swivelling angle S1 (cf. FIG. 1) of at least 90° can thus be achieved. In contrast, a rectangular cross section has the advantage of production of a plate 2 possibly being more cost-effective; however, the swivelling range can then scarcely amount to more than 90°.

The position shown of the pivot axis 5 has the advantage that the protective element 2 can be of weight-counterbalancing construction. Thus, by means of the two plate parts which reach over the pivot bearing having the same length and/or by them having the same weight, very precise counterbalancing of the protective element can be achieved. A protective element according to the invention can therefore be swivelled easily, by means of a driving device or directly by hand, from the initial position illustrated into a protective position (see FIG. 2) or a solar energy-absorbing position (see FIG. 3). Furthermore, this arrangement of the pivot bearing 5 in a central region of the protective element 2 has the advantage that the forces acting on the plate from the flood, snow and ice or from scree, can be distributed over a relatively large part 17, 17' of the substructure 6. In addition, with the arrangement according to the invention of the pivot bearing, the tensile forces acting on the pivot bearing are minimized. The substructure can be sealed with known means and reinforced in order to absorb the forces which arise. Unlike the illustrations in FIGS. 1–3— rather than tapering towards the longitudinal edges 3, 4, the plate 2 of the protective element 1 can be designed with any desired cross section, for example with a rectangular, concave or convex one. It is advantageous to lock the plate 2 in every desired position, but at least in preferred positions; the preferred device for flood or avalanche protection therefore has locking means 15, 15' (cf. FIG. 6) which are arranged, for example, on the plate 2 and/or on the substructure 6.

Figure 4:
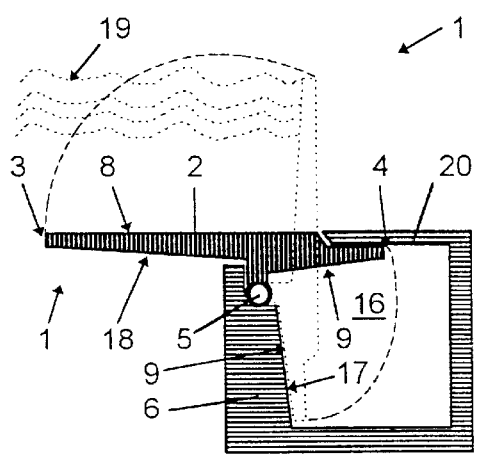
FIG. 4 shows a cross section through a device for flood protection, having a row of protective elements in an initial position and having a substructure which is bevelled on one side, and also having a channel.

FIG. 4 shows a cross section through a device for flood protection having a row of protective elements 1 in an initial position (shown by solid lines) and protective position (shown by dashed lines). In the event of a flood being expected, the first surface 8 of the plate 2, which surface can be used as a terrace which can be walked on or travelled over, is swivelled through 90° about the pivot bearing 5 which is fastened on the substructure 6. In the protective position resulting from this, the second surface 9, which does not have any solar collectors here, rests in a preferably plane manner on the corresponding part 17 of the substructure 6. This substructure has been designed here as a sheet-pile wall whose thickness increases towards the base of the wall. This has resulted in a substructure which is bevelled on one side and whose angle of inclination preferably coincides with the tapering angle of the plate 2. In the initial position shown, the plate rests with part of the smooth, third surface 18 on the crest of the sheet-pile wall or substructure 6, which is designed and reinforced correspondingly. At the same time, a channel 16 is formed on the protective side of the device for flood protection. A cantilever plate 20 covers part of the first surface 8 of the plate 2 and therefore prevents the plate from tilting. In the protective position, the first surface 8, which has been swivelled through 90° and is essentially standing vertically, almost adjoins the cantilever plate 20. It also emerges from FIG. 4 that by means of the specific cross-sectional form which is shown of the plate 2, a weight-counterbalancing structure has been selected. The protective surface 18 is somewhat larger than the contact-pressure surface 9 because the longitudinal edge 3 is further away from the pivot bearing than the longitudinal edge 4. In order at least approximately to counterbalance the plate 2 in terms of weight, that part of the plate which can be swivelled downwards is therefore of a relatively great thickness here, so that the volume corresponds to that of the part which can be swivelled upwards. However, it is clear to the expert that the balancing of the two volumes can mainly be used in plates having a solid profile; in the case of plates having a hollow profile, the expert will optionally place a counterweight in the downwardly swivelling part and/or provide this part with correspondingly heavier structural elements.

The channel is designed such that it is virtually sealed off in both end positions of the plate 2, because of the design of a device for flood or avalanche protection corresponding to FIG. 4, and thus enables media, such as gases or electricity, and/or liquids, such as water for operating the driving device or water to be conducted away from the waters (overflow) or from the protected environment (rainwater) to be supplied and/or removed in a manner which is protected from external influences, such as the weather, animals or else vandals. In addition, the channel can be used for accommodating, in a manner which is likewise protected from external influences, the driving device for the plate, and also for maintenance and operational purposes concerning it.

Figure 5:
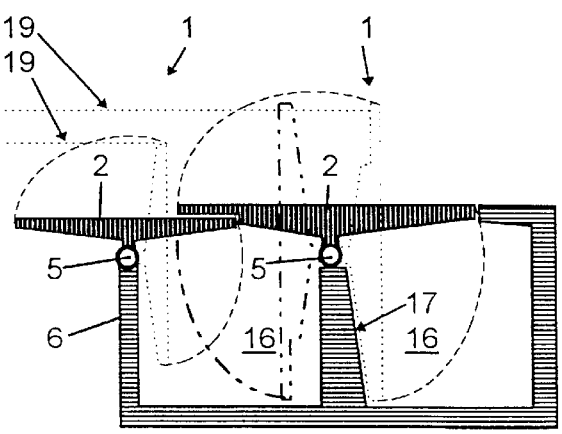
FIG. 5 shows a cross section through a device for flood protection having two rows of protective elements in an initial position and having a substructure which is vertical and is bevelled on one side and has channels.

FIG. 5 shows a cross section through a device for flood protection having two rows of protective elements 1 in an initial position (shown by solid lines), having one or two plates in a protective position (shown by dashed lines) and having a plate in a solar energy-absorbing position (shown by dash-dotted lines). The plates 2 are arranged in two or more rows in such a manner that they form, by swivelling, two or more protective walls against floods or avalanches. As emerges from this figure, the connection of one plate to the next one can be overlapping, and the connection of a plate to the substructure can be obtuse. A different design is also possible. The expert likewise has substantial freedom with the design of the substructure 6, with the result that the latter can be designed such that it is vertical and bevelled on one side or else on both sides. Substructures 6 having channels 16 which are arranged on the protective side of the plate 2 and of the pivot bearing 5 are preferred. The preferred, virtually sealed-off design of the channel 16 means that the pivot bearing 5, driving devices 14, locking means 15, 15' and all other important installations are protected from external influences, such as the weather, plants, animals or else vandals. As likewise emerges from FIG. 4, the plates 2 do not need to be swivelled precisely through 90°, the swivelling angle S2 (protective position) and the swivelling angle S1 (solar energy-absorbing position) can be greater than 90°, preferably 100°.

Figure 6:
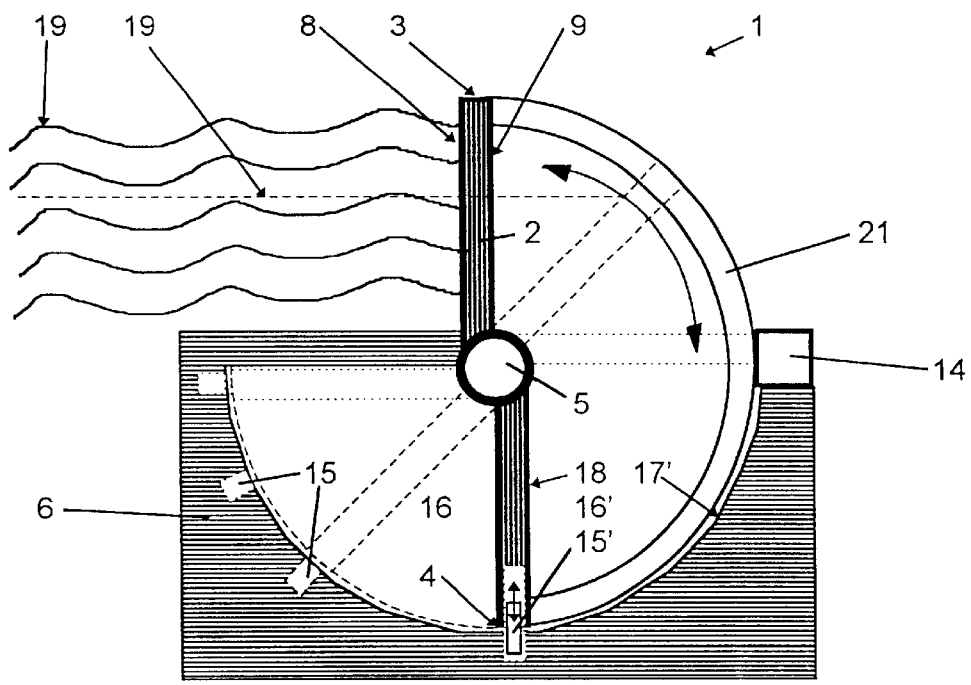
FIG. 6 shows a cross section through a device for flood protection having a row of protective elements with curved supports in the highest protective position and having a horizontal substructure.

FIG. 6 shows a second embodiment of the protective element 1 according to the invention. In accordance with the increased requirements of coastal protection on account of strong surf forces, this second embodiment has a pivot bearing 5 whose pivot axis is essentially identical to the gravity axis of the protective element. The second surface 9 and third surface 18 of the plate are preferably equipped with a row of curved supports 21, with the result that in every desired protective position, i.e. at every swivelling angle between 10° and 100°, the forces acting on part of the first surface 8 of the protective element 1 because of the flood are transmitted by the bearing 5 to the horizontal part of the substructure 6 and, via the curved supports 21, to the part 17', which is of a correspondingly barrel-shaped design, of the substructure 6. The curved supports 21 can be guided via rollers mounted in the substructure 6, or can themselves have bearings rolling along the substructure. By means of a driving device 14 which acts on the curved supports, the protective element can be brought into every desired position manually or by means of a motor. It is possible—as also in the first embodiment—to swivel a plate or a certain number of plates into the protective position automatically or via an early warning system. The arrangement of locking means in the form of depressions 15 and movable bolts 15' in each case in the substructure 6 and, respectively, in the second longitudinal edge 4 of the protective element 1 (or else vice versa) makes it possible to lock the protective element 1 in every desired position, or at least in particularly preferred positions. This enables the height of protection to be adapted at any time to the conditions and the water level: a basic protective position of the protective elements 1 for the highest water level is therefore omitted in the case of a small flood.

As emerges from FIGS. 4 to 6, the system solution on which the invention is based is a system component or a protective element 1 which consists essentially of a plate 2 and a pivot bearing 5 which is fixedly connected or can be connected to the substructure 6. The multifunctional design permits a structurally flexible, multi-use system: in the normal case, the first surface 8 of a plate 2 or of a number of plates 2 is aligned essentially horizontally, so that the first surface 8 of the plates can be used as a footpath or road. This can be the case in regions at risk of floods and also avalanches or rock falls. At times of intensive sunlight, the plates, if they are equipped with solar collectors, can be swivelled into the solar energy-absorbing position. By means of photo-voltaic elements, electrical energy can thus be produced directly. The subject matter of the invention is suitable for constructing devices for flood or avalanche protection having one, two or more protective walls arranged one behind another, for watering and drainage tasks, and also as a large surface area for the fixing and installing of solar and photo-voltaic systems for the purpose of permanent obtaining of energy.

At times of flood (the highest water levels are denoted by "19" in FIGS. 2, 4, 5, 6 and 9), the pivot element or the plate 2, pivoted by means of a tilting or swivelling device into an approximately vertical position and locked, is an effective, solid flood protection barrier. The protective element 1 is suitable both for retaining basins and spaces which are to be provided from new and also for reconstructing and enlarging existing dyke systems and retaining spaces. This is possible without more demand for land and without changing the dyke configuration. In the case of flood protection zones and retaining spaces which are to be provided from new, only about ⅕ to ⅒ of the land customarily required for dyke structures is required. Dyke summits which are equipped with systems of this type, can be adapted within a very brief time to the increased water levels by erecting the protective elements 2 which have a relatively large storage volume. Thus, even in the case of extremely high water, effective protection is provided against the surrounding countryside or the occupied areas being flooded.

Figures 7, 8:
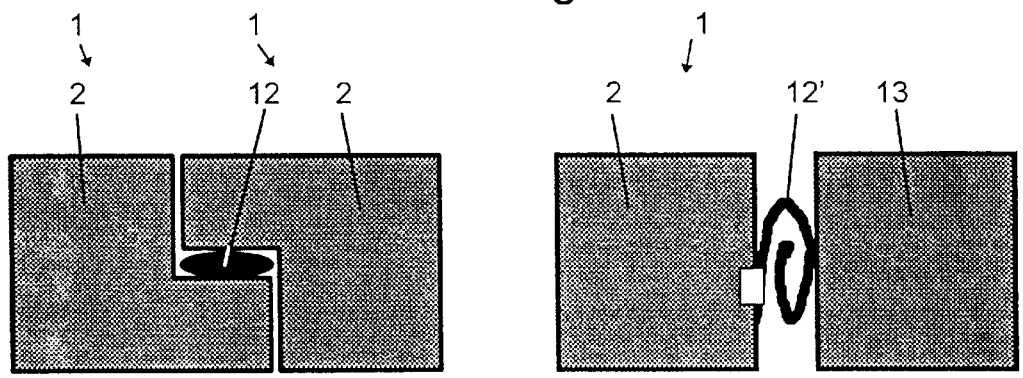
FIG. 7 shows a cross section through a joggled joint between two protective elements for flood protection.
FIG. 8 shows a cross section through a butt joint between two protective elements for flood protection.

FIGS. 7 and 8 show a cross section through a joggled and, respectively, butt joint between two protective elements for flood protection. The connection of an erected protective element to a further constructional unit 13, for example to an existing sheet-pile or dyke wall, to a supporting wall (for example in the case of an underpass or a tunnel) or else to another permanent structure for flood protection can take place in the same way as the sealing between two plates 2. At times when there is the risk of floods, unlocking and tilting devices are triggered and the protective elements 1 are pivoted into the desired protective position either automatically by means of a driving system or manually, or by means of shifting weight. The hydrostatic pressure against the tilted elements then grows in proportion to the rising water level, as a result of which the sealing elements 12, 12' or sealing strips, mounted in the gaps between the protective elements, are compressed in a water-tight manner. If a dyke system is fitted with a device according to the invention, the greater accumulation of water in the event of a flood causes the dyke system, in its originally unchanged configuration, to be stressed in an increasingly severe manner. The force is transmitted, preferably via structural designs, by means of a channel 16 which is arranged on the land side or protective side and into which the pivoting movement of the protective elements is carried out. This embodiment is expediently supplemented by load-removing substructures, such as slotted walls, bored piles and wall aprons, which, moreover, serve the purpose of influencing or controlling the profile of the seepage line.

Figure 9:
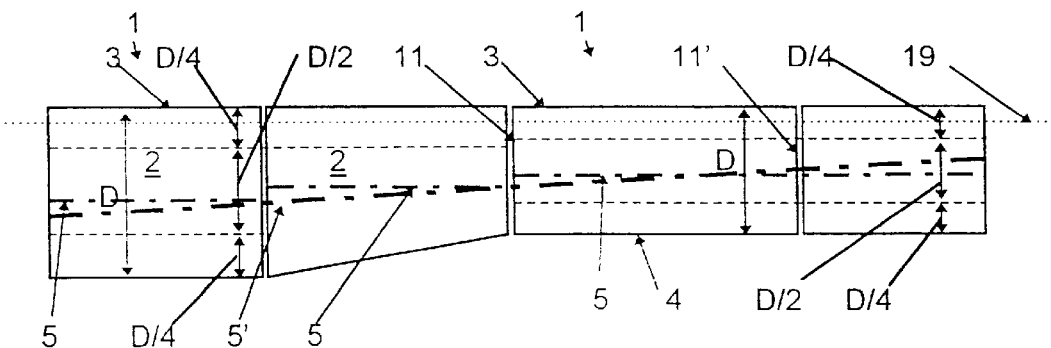
FIG. 9 shows a partial view of a device for flood protection having a row of protective elements in a protective position, at a damming height which differs in accordance with the profile of the terrain.

FIG. 9 shows the partial view of a device for flood protection. Various pivot bearings 5 are arranged at different heights, in the manner of steps, corresponding to the profile of the terrain. As an alternative to these, a longer pivot bearing 5' can also be arranged lying in an inclined manner. A common feature of both embodiments is that with one row of protective elements in the protective position, a differing damming height can be achieved. All of the protective elements 1 have a first and second longitudinal edge 3 and also two side edges 11, 11'. In this case, to be able to move the plates easily, it is essential for the pivot bearing, 5, 5' not to be arranged further away from the gravity axis 7 (not drawn in here) than by the mass D/4. Each plate can then be erected individually. However, in order to have to use as few driving devices as possible, or to bridge over a driving device which has broken down, two or more plates 2 can also be connected to one another, for example by means of bolts, and can be swivelled into the protective position together. A multiplicity of plates 2 can thus be swivelled jointly by means of an individual, directly driven plate 2.

Unlike the design and description of the locking means 15, 15' in FIG. 6, all of the locking means known in the prior art, such as clamps, hooks, supports, etc. can be provided for all of the embodiments of the protective element 1 and of the device for flood or avalanche protection. These locking means can be moved manually or mechanically and triggered automatically.

The design of the protective elements according to the invention and of the devices for flood or avalanche protection can encompass all of the structural forms and arrangement forms shown in the figures and/or described, in any desired combination.

Suitable constructional materials for the plates 2 are materials such as concrete, steel, cast iron, light alloys, glass or else plastics (for example, glass fibre reinforced plastics) and any desired combinations thereof. The protective elements can thus be injection moulded or cast in one piece, or else composed of individual parts, for example in the manner of a framework. Preferred driving devices include electric motors or motors operated with organic liquids or gases, hydraulic drives, compressed air drives or else counterweights which are to be filled with water. However, the elements can also be moved by hand or by external mechanical means, such as motor vehicles, cranes or the like.

An even better yield economically of electrical energy would be ensured if the run-off of the flood water from two or more overflow or retaining spaces arranged next to one another and having differing heights were conducted over a combination of turbine and generator.

Advantages of the protective elements according to the invention, devices and methods include the following:

The arrangement of the pivot bearing 5, 5' at a distance of at most D/4 from the gravity line 7 of the plates makes it possible to counterbalance and simultaneously move a plurality of protective elements or very large and heavy protective elements by hand or by means of few drives.

The coupling of a plurality of protective elements 1 permits greater freedom in the assigning of protective elements to a driving device, and also in the case of a driving device breaking down.

Cost-effective reconstruction and increase in the capacity of existing dyke and defence systems, and also the production of corresponding, new devices for flood or avalanche protection are possible without additional land being required.

Equipping devices and systems of this type with solar and photo-voltaic technology permits energy to be obtained permanently and an at least partial refinancing thereof.

The provision of energy to the populated areas otherwise at threat from floods can be supplemented by the multiple use of the dyke systems as defence systems, on the one hand, and as storage and retaining basins, on the other hand—in combination with corresponding energy-producing systems.

The production of seasonally appropriate protective devices against avalanches of snow, ice and/or scree enables districts used touristically, in particular, to be safeguarded without the landscape being impaired visually all year round.

What is claimed is:

1. A device for protecting against flood or avalanches, comprising:
   a protective element having a plate with a first longitudinal edge and a second longitudinal edge, the first and second longitudinal edges being spaced apart from each other by a distance;
   the protective element further including a pivot bearing arranged essentially parallel to at least one of the first longitudinal edge and the second longitudinal edge, the pivot bearing being designed for transmitting and absorbing forces acting on the protective element;
   a substructure, the plate being movably arranged on the substructure with the pivot bearing such that the plate swivels relative to the substructure in a swiveling range,
   the pivot bearing being arranged spaced apart at a maximum of a quarter of the distance from an axis of the plate to compensate for forces acting on the plate and on the pivot bearing, the axis running between and essentially parallel to the first and second longitudinal edges; and
   a driving device operatively connected to the plate for swiveling the plate.

2. The device according to claim 1, wherein the driving device is one of a manually operated driving device and a motor operated driving device.

3. The device according to claim 1, wherein the plate has at least one surface designed to be at least one of walked on and traveled over.

4. The device according to claim 1, further comprising solar collectors arranged on the plate.

5. The device according to claim 1, further comprising one of an additional plate and a constructional unit arranged adjacent to the plate, and wherein the plate includes side edges with sealing elements arranged such that the plate forms an essentially water-tight connection with the one of the additional plate and the constructional unit.

6. The device according to claim 1, wherein the swiveling range of the plate covers an angle of between 10° and 200°.

7. The device according to claim 1, wherein the swiveling range of the plate covers an angle of between +100° and −100° from an inoperative position.

8. The device according to claim 1, wherein the swiveling range of the plate is greater than 90°.

9. The device according to claim 1, further comprising means for locking the plate into a desired swiveling position with respect to the substructure.

10. The device according to claim 1, wherein the substructure defines a channel for supplying and removing media and liquids.

11. The device according to claim 10, wherein the plate is arranged to close off the channel in at least one of a protective position and an inoperative position.

12. The device according to claim 10, wherein the driving device is arranged in the channel and adjacent the pivot bearing.

13. The device according to claim 12, wherein the plate is arranged to close off the channel in a protective position and an inoperative position.

14. A device for protecting against floods or avalanches, comprising:
   at least two protective elements, each protective element having a plate with a first longitudinal edge and a second longitudinal edge, the first and second longitudinal edges of each of the plates being spaced apart from each other by a distance;
   wherein each of the protective elements includes a pivot bearing arranged essentially parallel to at least one of the first longitudinal edge and the second longitudinal edge of the respective plate;
   wherein each of the pivot bearings is designed for transmitting and absorbing forces acting on the respective protective element;
   a substructure, each the plates being movably arranged on the substructure with the respective pivot bearing such that each of the plates can swivel with respect to the substructure in a swiveling range;
   wherein each of the pivot bearings is arranged spaced apart at a maximum of a quarter of the distance from an axis of each of the plates to compensate for forces acting on the respective plate, each of the respective axis extending between and essentially parallel to the respective first and second longitudinal edges; and
   a driving device operatively connected to at least one of the plates for moving the at least one of the plates.

15. The device according to claim 14, wherein the driving device is one of a manually operated driving device and a motor operated driving device.

16. The device according to claim 14, wherein the plates are arranged such that the plates form, by swiveling, a protective wall.

17. The device according to claim 14, wherein the plates are arranged in at least two rows such that they form, by swiveling, at least two protective walls.

18. The device according to claim 14, wherein the driving device is operatively connected to and swivels each of the plates.

19. A method for protecting an area against floods or avalanches, comprising:
   providing a plurality of protective elements, each protective element having a plate with a first longitudinal edge and a second longitudinal edge, the first and second edges being spaced apart from each other by a distance, the protective elements each including a pivot bearing arranged essentially parallel to at least one of the first longitudinal edge and the second longitudinal edge, the pivot bearings being designed for transmitting and absorbing forces acting on the protective elements, the plates being arranged on a substructure with the pivot bearings such that the plates are movable relative to the substructure in a swiveling range, the pivot bearings each being arranged spaced apart at a maximum of a quarter of the distance from an axis of each the plates in order to compensate for forces acting on the respective plate and bearing, each of the axis extending between and essentially parallel to the respective first and second longitudinal edges, and one of a manually operated driving device and a motor operated driving device for swiveling the plates; and swiveling the plates about said pivot bearings into a protective position such that a surface of at least one of the plates bears against a part of the substructure such that forces exerted by at least one of a flood and snow on another surface of the at least one plate is transmitted essentially uniformly to the part of the substructure.

20. The method according to claim 19, wherein, during the swiveling step, the plurality of plates are swiveled into the protective position by at least one of automatically and an early warning system.

* * * * *